United States Patent [19]

Baierl

[11] 4,155,849
[45] May 22, 1979

[54] ADSORBER-REGENERATOR

[76] Inventor: Kenneth W. Baierl, 830 S. Kernan Ave., Appleton, Wis. 54911

[21] Appl. No.: 820,509

[22] Filed: Aug. 1, 1977

[51] Int. Cl.² .................... B01D 53/04; B01D 23/14
[52] U.S. Cl. ........................ 210/90; 55/179; 55/387; 210/264; 210/266; 210/275; 210/284; 210/293
[58] Field of Search .............. 55/179, 387, 389; 210/264, 266, 274, 275, 284, 289, 291, 292, 293, 90, 149; 23/288 R

[56] References Cited

U.S. PATENT DOCUMENTS

| 243,975 | 7/1881 | Ridgway | 210/275 |
| 605,152 | 6/1898 | Twitchell | 210/274 X |
| 629,942 | 8/1899 | Wanner, Jr. | 210/264 |
| 636,447 | 11/1899 | Paddock | 210/264 |
| 677,670 | 7/1901 | Krauss et al. | 23/288 R X |
| 1,182,465 | 5/1916 | Evans | 210/284 X |
| 1,680,840 | 8/1928 | Barnebey | 23/288 R |
| 1,698,890 | 1/1929 | McGill | 210/266 X |
| 2,324,764 | 7/1943 | Carruthers et al. | 210/264 X |
| 2,772,236 | 11/1956 | Coonradt et al. | 210/284 X |
| 3,214,247 | 10/1965 | Broughton | 210/264 X |
| 3,948,775 | 4/1976 | Otani et al. | 210/264 |
| 3,955,946 | 5/1976 | Fuhring et al. | 55/179 |

FOREIGN PATENT DOCUMENTS 95202 12/1896 Fed. Rep. of Germany ........... 210/284

*Primary Examiner*—Robert H. Spitzer
*Attorney, Agent, or Firm*—Robert D. Yeager

[57] ABSTRACT

An adsorption-regeneration column section is provided for treating a fluid effluent. A column section has means, which do not contact the adsorbent, for feeding an effluent into the column section and a means for uniformly distributing the effluent across the column diameter at the inlet thereof. An adsorbent is supported within the column section and occupies less than the entire column section. The column section is further provided with means for removably connecting a second column section with said column section along a single vertical axis without substantially restricting the flow path of the effluent. When two of the column sections are joined each having adsorbent therein, a staging space is provided between the adsorbents within the column sections for disengagement of the effluent from the adsorbent.

13 Claims, 7 Drawing Figures

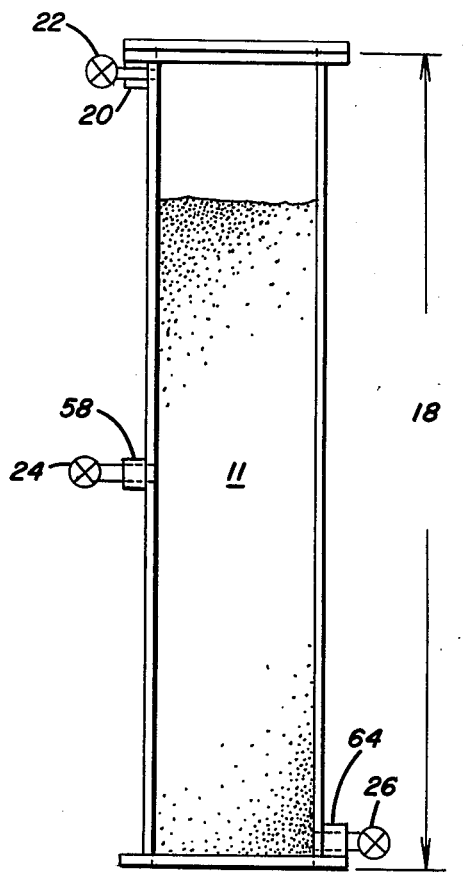
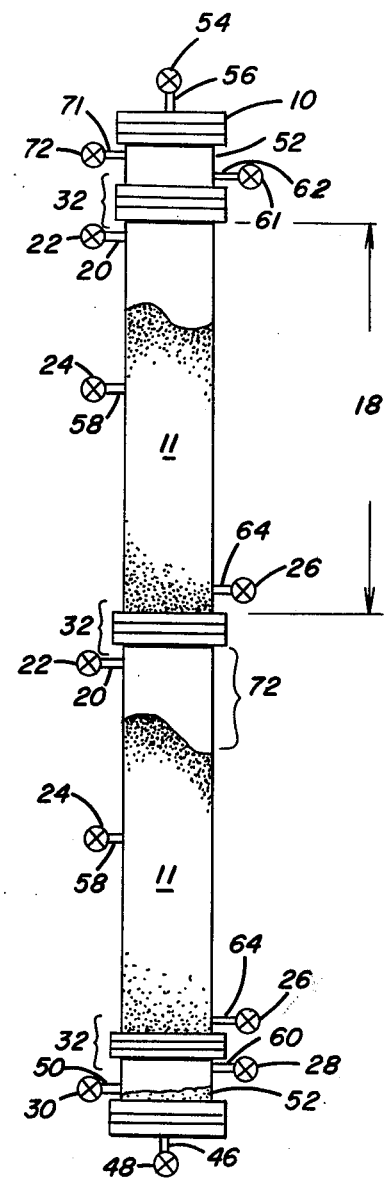
FIG. 6
FIG. 7

ADSORBER-REGENERATOR

BACKGROUND OF THE INVENTION

1. Field of the Invention

This invention relates to adsorbers and more particularly to column adsorbers.

2. Description of the Prior Art

Solid chemical adsorbents such as activated carbons, silica gel, active alumina, and the like have been successfully used in separating fluid materials according to their respective polarities. During the infancy of this technology, liquids were intimately mixed with the solid adsorbent until the adsorption of a particular ingredient was accomplished. The adsorbent was then filtered leaving the desired purified product. Gases, however, were continuously passed through a column packed with the adsorbent and impurities were removed in this manner. Technical advances soon allowed liquids to be passed on a continuous basis through columns containing the adsorbent which was much more economical than the bulk processes.

Adsorption columns have been used for the purification of materials prior to their use in industrial processes; for the recovery of by-products of industrial processes; for the purification of wastes subsequent to disposal; and for a host of other uses. The purification through columns is substantially more advantageous than the bulk processes in that the step of agitating a particular material in the presence of the adsorbent is eliminated along with a separation of the adsorbent from the purified material.

Typically, when it is believed that a particular material can be purified or recovered in an adsorption column, when such recovery or purification has never been accomplished, as in any other technology, it is necessary to experiment with various adsorbents, column heights, column widths, and other variables on a laboratory scale to determine if the process is feasible and to obtain the particular scaling data necessary to reproduce the desired results on a commercial scale. From the laboratory, pilot plant size experiments based on the laboratory runs are conducted to further determine the feasibility and proper sizing of adsorption equipment for the particular purification or recovery process. After satisfactory results have been obtained and adjustments made in sizing and apparatus, the process is then scaled to the commercial level. Although the laboratory and pilot plant experiments are indicative of desirable results which can be achieved on a commercial scale, exact sizing and other adsorption variables are not completely adaptable to direct scale-up to a commercial installation. Thus, an industrial processor may undergo the laboratory and pilot plant scale-ups and build a commercial adsorber and find that it does not necessarily meet his needs. This, among other reasons, has inhibited the use of adsorbers in various industrial processes.

A further reason for the inhibition of manufacturers to install adsorption equipment is the cost of desorption of the adsorbents. In a typical industrial process, the particular material is passed through the adsorbent in the column on a continuous basis. After so much of the impurity or by-product is adsorbed, the adsorbent reaches its saturation point and no longer adsorbs the desired materials. Usually this requires that the process be halted, the columns emptied of adsorbent, and the adsorbent be regenerated by desorption through well-known processes. After desorption the adsorbent is recharged to the column and the process is continued.

In the small scale adsorption systems, i.e. columns which are 4-10 inches in diameter by 5-10 feet high, the adsorbent can be readily supported and the liquid and/or vapor passing through the adsorbent can readily be distributed. Further, the loading and the removal of the adsorbent from the column can be readily accomplished. However, on an industrial scale the columns are usually 6 feet or more in diameter and 10 feet or more in height. The mass alone, of adsorbing material, causes difficulty in loading and removal of the adsorbent and in the regeneration of the spend adsorbent. In some of the large commerical systems, the adsorbent is supported with screening at the bottom of the adsorption column having a mesh substantially greater than the size of the adsorbent. Further, in some instances distributors are placed throughout the length of the column to provide a uniform distribution of material to be treated across the diameter of the adsorber. These distributors are necessarily placed intermittently along the length of the column to prevent channeling of the particular material. Channeling is a phenomenon in which random paths are taken by the material causing it to by-pass adsorbent media. Because of the weight of the adsorbent, problems involved in these systems include the screening, which supports the adsorbent, rupturing and also the distributors along the column length plugging with adsorbent causing the flow of material to be restricted or stopped. Both of these occurences require equipment down time due to the necessity for repairing these clogged distributors and ruptured screens. Further the adsorbent must be removed from the column and stored while repairs are undertaken.

In accordance with the present invention, an adsorber is provided which eliminates the risks involved in scaling units from pilot plant size to very large commercial size installations and allows lower desorption costs, while providing the advantage that the adsorbent may be easily loaded into and removed from the adsorber.

Further, in accordance with the invention, most of the adsorbent may be easily retained and supported in the adsorber while ruptured screens are repaired. By disengaging the distributors from the adsorbent, their clogging potential is minimized. Both of these aspects of the invention result in reduced maintenance cost and equipment down time.

BRIEF DESCRIPTION OF THE INVENTION

An adsorber-regenerator is provided which is composed of a plurality of sections. Each adsorber section has a means for feeding a fluid effluent into the column section. At the inlet end there is a means that does not contact the adsorbent for distributing the fluid effluent uniformly across the diameter of the column. Each column section contains an adsorbing material, such as activated carbon, silica gel, active alumina, or the like and partially occupies the column section. Further, in each column section a means is provided for supporting the adsorbing means within the section and each column section has a means for removably connecting a second column section with another column section so that each section is aligned along a vertical axis with the plurality of column sections forming a single column. Between the adsorbents in each of their respective column sections, a staging section is provided for disengagement of the effluent from the adsorbent.

The following description of the drawings will more fully illustrate the invention.

BRIEF DESCRIPTION OF THE DRAWINGS

FIG. 6 is a front view partially in section of a single column section; and,

FIG. 7 is a front cross-sectional view of a two section column.

DETAILED DESCRIPTION OF THE DRAWINGS

Figure 1:
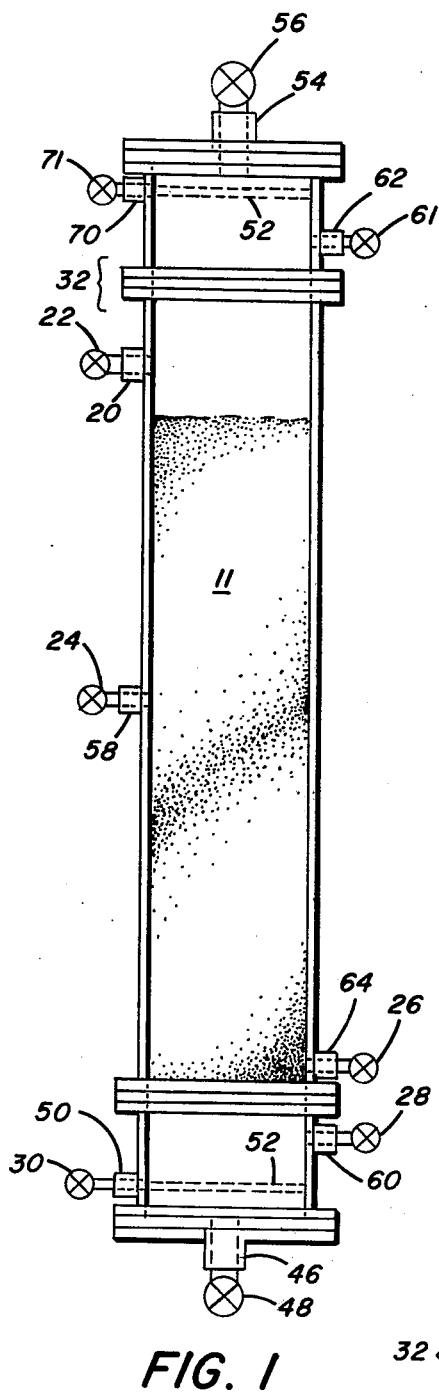
FIG. 1 shows the basic adsorber unit partially in section having an inlet and an outlet.
Figure 2:
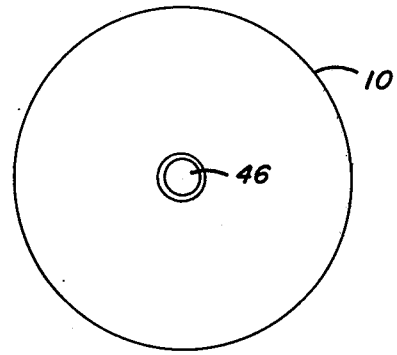
FIG. 2 is a front view of the inlet and outlet plates 10.
Figure 3:
FIG. 3 is a side view of the plate shown in FIG. 2.
Figure 4:
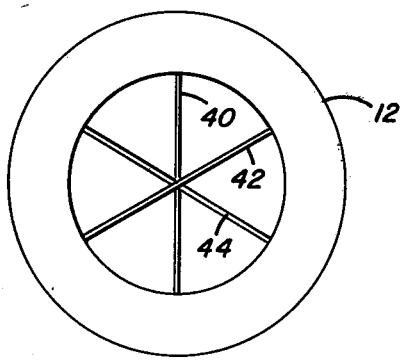
FIG. 4 is a front view of the bottom and top plates 12 and 14.
Figure 5:
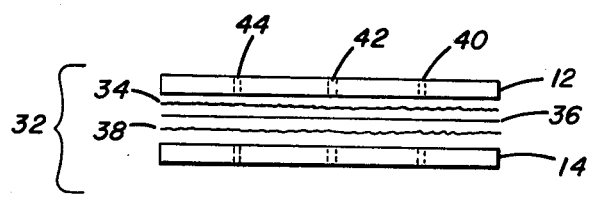
FIG. 5 is a side view partially exploded of the plates 12 and 14 with the screen 16 therein all of which form the adsorbent support 32.

In FIGS. 1 through 7 like reference numerals refer to like elements. The apparatus shows an adsorber which may be used with either a feed through the bottom and discharge through the top, or feed through the top and discharge through the bottom. However, for the sake of convenience and clarity, the following description of the Figures and method of operation will be cast in terms of a process wherein the material is fed in the bottom and discharged through the top.

Referring now to FIGS. 1 through 6 there is an adsorption column shown using activated carbon 11. The basic column section 18 in this embodiment is 12 feet high and 10 inches in diameter and contains approximately a 10 foot height of activated carbon having a mesh of 12×40. Column section 18 has a flange 19 at each end. The activated carbon is charged as an aqueous slurry from a carbon loading tank (not shown) into the adsorber by charging inlet 20 while valve 22 is in an open position with all of valves 24, 26, 28 and 30 in the closed position. As the slurry is fed into the column activated carbon falls upon and is supported by screen plate 32, which has a substantially greater mesh than the activated carbon. Preferably, there are three distinct screens; 34, 36 and 38 which comprise screen section 32 along with reinforcing backing plates 12 and 14 to provide structural integrity to the activated carbon supporting screen assembly 32. Plates 12 and 14 are provided with reinforcing cross members 40, 42 and 44 to further reinforce the structure. Plates 12 and 14 along with the screens 34, 36 and 38 are welded together in a single unit to provide the proper structure. As installed, screen section 32 is disposed between opposed flanges 19 of adjacent sections of the adsorption column. The water freed of the activated carbon which is charged to the column is discharged through water discharge outlet 46 with valve 48 in an open position with the water being returned to the carbon slurry tank.

In operation, a solution containing the material to be adsorbed is charged through material inlet 50 with valve 30 in the open position and into distributor 52 which uniformly distributes the material across the diameter of the column. The distributor 52 is not in contact with the adsorbent 11; this aspect of the invention obviates the problem of the adsorbent clogging the distributor 52, resulting in reduced down time of the adsorber. Material is passed upwardly through the activated carbon and through discharge outlet 54. The material may then be reused or disposed of depending on the particular application. During the purification process all of the valves are in closed position except for valve 30 on inlet 50 and valve 56 on outlet 54.

As the material to be purified passes through the column an expanded adsorbent bed may be produced by the upward flow of the material against the carbon. The activated carbon is prevented from passing through outlet 54 by a screen section 32 identical to that as previously described.

Inlets 58, 60 and 62 are provided for the monitoring of temperature, pressure and purification levels within the column during operation. After a sufficient quantity of material has been passed through the activated carbon in the column and the activated carbon no longer provides adequate purification properties, it may be recycled in a vessel separate from the column, or discarded or desorbed in situ. If the activated carbon is to be removed from the column, all valves are closed except valves 56 and 26, and the carbon is discharged through outlet 64 by water pressure introduced through inlet 56.

When the spent activated carbon is to be chemically desorbed, a desorbing agent (a liquid solvent, a chemical that will react with the adsorbed chemical in the liquid and/or vapor phase, a vapor and/or an inert gas) is introduced into the adsorber through desorber inlet 70 with valve 71 open and through distributor 52 performing the identical function as the bottom distributor 52. The desorbing agent passes through the activated carbon carrying along with it the desorbed chemical in its natural or reacted state and is discharged into a chemical recovery system (not shown) through outlet 46.

Referring now to FIG. 7, an adsorber using two sections is shown. Essentially FIG. 7 is another column section as shown in FIG. 6 interposed between the screen section 32 of FIG. 1 and top section 68 of FIG. 1. In operation the fluid effluent is fed into inlet 50 with valve 30 open and passes through the activated carbon 11. Depending on the velocity of the effluent, an extended bed may be formed in volume 72. However in any event, the effluent is disengaged from the activated carbon in the staging section defined by volume 72 before proceeding into the upper stage of the adsorber. This disengagement provides the advantage of a column, having a certain effective height defined by its packed area, which does not perpetuate channeling. Once channeling in a packed column begins, it becomes more severe during continued operation. According to the present invention, a channel may occur in a single column section and not be extended to another column section because of the staging section.

In volume 72, in addition to disengagement of the effluent from the adsorbent, the effluent uniformly redistributes across the cross-sectional area of the column so that channeling is avoided.

In a multiple sectioned column as is shown in FIG. 7, a particular advantage of the invention resides in the capability of each section to be separately charged and discharged, and separately regenerated in situ. The multiple sectioned column can be built to any desired height using the column sections shown. If during operation any screen section 32 ruptures, that column section with the ruptured screen may be removed and a new section 18 readily inserted in its stead. The single vertical column allows a single liquid pressure to be exerted on the liquid entering the column, thus increasing the retention time of immiscible liquids to be adsorbed which are heavier than the mother liquor. The prior art columns, arranged in series, had to be pressurized to increase the retention time of similarily composed effluents.

The following examples are illustrative of processes utilizing the invention.

EXAMPLE I

Sulfite process waste evaporator condensates were analyzed to contain the following:

TABLE I

| Waste Condensate Constituents | | Percent by Weight | Feed Rate lbs. per hr. |
|---|---|---|---|
| methanol | | 0.0620 | 0.31 |
| furfural | | 0.0120 | 0.06 |
| acetic acid | | 0.2760 | 1.38 |
| water | | 99.6500 | 498.25 |
| | Total | 100.0 | 500.0 |

The evaporator condensate was fed through the distributor 52 of the column shown in FIG. 1 which contained 125 lbs. of activated carbon having a mesh of 12×40. The feed rate was maintained at 500 lbs. per hour for 85 hrs. before trace amounts of furfural appeared at the discharge outlet 56. The discharge condensate was analyzed to contain the following:

TABLE II

| Waste Condensate Constituents | | Percent by Weight | Flow Rate lbs. per hr. |
|---|---|---|---|
| methanol | | 0.062 | 0.31 |
| furfural | | trace | |
| acetic acid | | 0.276 | 1.38 |
| water | | 99.662 | 498.31 |
| | Total | 100.0 | 500.0 |

Thus the activated carbon was calculated to contain 5.1 lbs. of furfural.

EXAMPLE II

An additional adsorber section as shown in FIG. 6 was added on the top of the first section of FIG. 1 to form an adsorber as shown in FIG. 7. The second column section contained the identical amount and mesh activated carbon as the column section of FIG. 1. The condensate feed used in Example I was continued at the same rate through the same distributor for an additional 85 hrs. before trace amounts of furfural appeared. The effluent from the top of the second section at that time was identical in composition to that in the effluent from that in the first section in Example I. The carbon (250 lbs.) was calculated to contain 10.2 lbs. furfural.

EXAMPLE III

A regenerating agent, methanol vapor, was introduced through inlet 70 and through distributor 52 at the top of the second section of the adsorber at the rate of 0.3 gallons per minute for 24 hrs. The column was then purged with 100° C. steam at the rate of 0.15 gallons per minute for an additional 24 hrs. The final column effluent was water containing 0.0001 percent by weight furfural.

EXAMPLE IV

The same condensate used in Examples I and II was fed into the dual section column described in Example II with both column sections containing the regenerated activated carbon of Example III. The material was fed at the same rate as Examples I and II for 170 hrs. The effluent from the top section of the adsorber after 170 hrs. had the same composition as the Example I effluent.

EXAMPLE V

The sulfite process waste evaporator condensates, which were processed in Examples I, II and IV having the furfural removed, were further processed in the adsorber of FIG. 1. The activated carbon had been regenerated, and the adsorber had the additional section removed. The condensate was fed through the distributor 70 in the top of the adsorber. The feed rate was maintained at 500 lb./hr. through the 125 lbs. of carbon for 3.75 hrs. before trace quantities of acetic acid appeared in the effluent. The effluent was analyzed to contain the following:

TABLE III

| Waste Condensate Constituents | | Percent by Weight | Flow Rate lbs. per hr. |
|---|---|---|---|
| methanol | | 0.062 | 0.31 |
| furfural | | — | — |
| acetic acid | | trace | — |
| water | | 99.938 | 499.69 |
| | Total | 100.0 | 500.0 |

The carbon was calculated to contain 5.2 lbs. of acetic acid.

EXAMPLE VI

An additional adsorber section identical as shown in FIG. 6 and packed with 125 lbs. of activated carbon was added to the bottom of the adsorber to form a column as shown in FIG. 7. The condensate feed used in Example V was continued at the same rate through the same distributor for an additional 4.75 hrs. before trace amounts of acetic acid appeared. The effluent from the bottom of the second section at that time was identical in composition to that in the effluent from the first section in Example V. The carbon (250 lbs.) was calculated to contain 11.73 lbs. of acetic acid.

EXAMPLE VIII

A regenerating agent, ethanol vapor, was introduced into the distributor in the bottom section of the adsorber of Example VI under the activated carbon at the rate of 0.3 gallons per minute for 12 hrs. This ethanol was purged in 100% steam at the rate of 0.15 gallon per minute for another 12 hrs. The final effluent was 100% water.

EXAMPLE VIII

The same condensate as used in Examples V and VI was fed in the same distributor at the same rate for 9.5 hrs. before a trace quantity of acetic acid appeared. The carbon was calculated to contain 13.11 lbs. of acetic acid.

The foregoing Examples illustrate that the second section of the adsorber operates at the same efficiency as the first section above. The difference in adsorption performance when treating furfural versus acetic acid is attributed to furfural's being adsorbed over a longer period of time and having a faster break period than acetic acid. The break period is the time taken by a particular chemical once it appears in the effluent, until it reaches its feed concentration.

Further the alcohol vapor-steam purge regenerated activated carbon produced equal or superior results over the virgin activated carbon. The superior results are attributed to the top column section being exposed to the regenerating and purging agents over a longer period of time than the bottom column section, thus providing a more effective reactivated carbon in the top section.

What is claimed is:

1. An adsorption-regeneration column for treating a fluid material comprising:
   inlet means disposed at the top and at the bottom of the column for selectively feeding into said column said fluid material or a regenerating agent;
   adsorbing means for selectively adsorbing constituents of said fluid material, said adsorbing means partially occupying a zone in the column between the top and bottom;
   means connected to said inlet means for distributing said fluid material and said regenerating agent uniformly across the diameter of the column, said distributing means not being in direct contact with said adsorbing means;
   support means for supporting and retaining said adsorbing means within a zone between the top and the bottom of the column, said support means allowing said fluid material and said regenerating agent to pass therethrough;
   outlet means disposed at the top and at the bottom of the column for withdrawing fluid material and regenerating agent from the column; and,
   port means for adding or withdrawing automatically said adsorbing means from the partially occupied zone of the column, whereby at one time said fluid material may be selectively fed into one of said inlet means and withdrawn through the opposite outlet means, and at other times said regenerating agent may be selectively fed into one or both of said inlets and withdrawn through said outlet means.

2. The adsorption-regeneration column as claimed in claim 1 wherein:
   said adsorbing means comprises activated carbon.

3. The adsorption regeneration column as claimed in claim 1 wherein:
   said support means for supporting and retaining said adsorbing means and for enhancing distribution of the said fluid material or regenerating agent comprises:
   a pair of annular plates having an opening of approximately the same diameter as the interior of said column;
   a plurality of reinforcing rods positioned across the diameter of each of said annular plates;
   an annular screen member having a greater mesh than said adsorbing means coaxial with said annular plates, and interposed therebetween; and,
   said plates and said screen member being welded into a unitary structure about the outer periphery thereof.

4. The adsorption-regeneration column as claimed in claim 1 comprising:
   monitoring means for monitoring the temperature, pressure and/or purification levels of the adsorbent.

5. The adsorption-regeneration column as claimed in claim 1 wherein the adsorption zone comprises:
   at least two distinct and separate adsorption sections of column between the top and bottom;
   at least two means for supporting and retaining adsorbents in said adsorption sections;
   means for adding and/or withdrawing automatically said adsorbents from each adsorption section.

6. The adsorption-regeneration column of claim 5 wherein:
   each adsorption section contains the same and/or different adsorbent.

7. The adsorption-regeneration column of claim 5 wherein:
   each adsorption section has its own means for monitoring the temperature, pressure and/or purification levels of the adsorbent.

8. The adsorption-regeneration column of claim 5 wherein:
   each adsorption section is identical.

9. A vertical adsorption column for treating a fluid comprising:
   an elongated center section;
   adsorbing material disposed within said elongated center section;
   a top retaining member connected to the top end of said elongated center section for retaining said adsorbing material within said elongated center section but allowing the treated fluid to pass therethrough;
   a bottom retaining member connected to the bottom end of said elongated center section for retaining and supporting said adsorbing material within said elongated center section but allowing the treated fluid to pass therethrough;
   a pair of openings, which are sealable, formed on opposite ends of said elongated center section for admitting said adsorbing material to said elongated center section and discharging said adsorbing material from said elongated center section;
   a top end section connected to said top retaining member having an inlet, an outlet, and a monitoring port;
   a top distributing means connected to said top inlet for distributing fluid coming through said top inlet uniformly across the column and not in direct contact with said adsorbing material;
   a bottom end section connected to said bottom retaining member comprising an inlet, an outlet, and a monitoring port; and
   a bottom distributing means connected to said bottom inlet for distributing fluid coming in through said bottom inlet uniformly across the column and not in direct contact with said adsorbing material,
   whereby at one time said fluid may be selectively fed into one of said inlets and withdrawn through the opposite outlet, and at other times a regenerating agent may be selectively fed into one or both of said inlets and withdrawn through said outlet.

10. An adsorption column as claimed in claim 9 wherein said top retaining member and said bottom retaining member each comprises:
    a pair of annular plates having an opening of approximately the same size as the interior of said column;
    a plurality of reinforced rods positioned across the diameter of each of said annular plates;
    a screen member having a greater mesh than said adsorbing material aligned with the opening in said annular plates and disposed therebetween; and,
    fastening means securing said plates and said screen into a unitary structure.

11. An adsorption column as claimed in claim 10 wherein:
    said top end section comprises a top tubular member connected to said top retaining member and having said inlet and said monitoring port formed in the side thereof and a top end plate, sealing the open end of said top tubular member and having said top outlet formed therein; and, said bottom end section comprises a bottom tubular member connected to said bottom retaining member and having said inlet and said monitoring port formed in the side thereof and a bottom end plate, sealing the open end of said bottom tubular member and having said bottom outlet formed therein.

12. An adsorption column as claimed in claim 11 wherein:

said top tubular member includes a top flange connection suitable for connection to a similar shaped flange; and, said bottom tubular member includes a bottom flange suitable for connection to a similar shaped flange.

13. An adsorption column as claimed in claim 12 wherein:

said adsorbing material comprises activated carbon.

* * * * *

UNITED STATES PATENT AND TRADEMARK OFFICE
CERTIFICATE OF CORRECTION

PATENT NO. : 4,155,849
DATED : May 22, 1979
INVENTOR(S) : Kenneth W. Baierl

It is certified that error appears in the above-identified patent and that said Letters Patent are hereby corrected as shown below:

On the cover, item [76], change the inventor's address to read --2721 Rail Road, Appleton, Wisconsin 54911--.

Column 2, line 13, "spend" should be --spent--.

Column 3, line 52, --32-- should be inserted after "unit".

Column 6, line 38, "EXAMPLE VIII" should be --EXAMPLE VII--.

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*